US007016070B2

(12) United States Patent
Pham et al.

(10) Patent No.: US 7,016,070 B2
(45) Date of Patent: Mar. 21, 2006

(54) MULTIPLE-LEVEL PRINTHEAD USING EMBEDDED HIGH SPEED SERIAL DATA AND CONTROL LINK WITH ON-BOARD EXPOSURE CLOCK GENERATION

(75) Inventors: Hieu T. Pham, Cary, NC (US); Yee S. Ng, Fairport, NY (US); Shawn E. O'Hara, Rochester, NY (US); William L. Chapman, Hemlock, NY (US)

(73) Assignee: Eastman Kodak Company, Rochester, NY (US)

( * ) Notice: Subject to any disclaimer, the term of this patent is extended or adjusted under 35 U.S.C. 154(b) by 1081 days.

(21) Appl. No.: 09/794,693

(22) Filed: Feb. 27, 2001

(65) Prior Publication Data

US 2002/0154321 A1    Oct. 24, 2002

(51) Int. Cl.
    G06F 15/00    (2006.01)
(52) U.S. Cl. .......................... 358/1.3; 358/1.8; 358/1.1; 358/1.9
(58) Field of Classification Search ............. 358/1.3, 358/1.8, 1.1–1.9, 1.11; 347/237, 238, 130, 347/247, 251, 252
    See application file for complete search history.

(56) References Cited

U.S. PATENT DOCUMENTS

| 4,750,010 | A |   | 6/1988  | Ayers et al. ............. 346/107 R |
| 5,255,013 | A |   | 10/1993 | Ng et al. ................. 346/107 R |
| 5,300,960 | A |   | 4/1994  | Pham et al. ................. 346/154 |
| 5,317,344 | A |   | 5/1994  | Beaman et al. .......... 346/107 R |
| 5,327,524 | A | * | 7/1994  | Ng .............................. 358/1.8 |
| 5,384,646 | A |   | 1/1995  | Godshalk et al. ............ 358/448 |
| 5,493,322 | A |   | 2/1996  | Ng et al. ..................... 347/240 |
| 5,546,165 | A |   | 8/1996  | Rushing et al. ............. 355/208 |
| 5,657,069 | A |   | 8/1997  | Kelly et al. ................. 347/237 |
| 5,739,841 | A |   | 4/1998  | Ng et al. ...................... 347/237 |
| 5,805,197 | A | * | 9/1998  | Fleming et al. ............. 347/237 |
| 5,818,501 | A |   | 10/1998 | Ng et al. ..................... 347/240 |
| 5,828,400 | A |   | 10/1998 | Fleming ....................... 347/238 |
| 5,859,657 | A |   | 1/1999  | Donahue et al. ............ 347/237 |
| 5,926,201 | A |   | 7/1999  | Fleming et al. ............. 347/237 |
| 6,061,078 | A |   | 5/2000  | Ng et al. ...................... 347/237 |

OTHER PUBLICATIONS

"Gray Level Printing Method with Embedded Non-Uniformity Correction Using a Multi-Bit LED Printhead," Yee S. Ng, Hieu T. Pham, Hwai T. Tai, and Eric K. Zeise; Research and Technology Development, Office Imaging, Eastman Kodak Company, Rochester, NY.

* cited by examiner

Primary Examiner—Twyler M. Lamb (57) ABSTRACT

A product and process for an LED printhead used in electrophotographic printing that generates an exposure clock on the printhead for the LEDs. The present invention provides a high-speed interface that transmits print data that has been modified, or corrected, using the corresponding unique printhead brightness data as the base reference source data to the printhead boards. The corrected print data is then applied to the LED drivers that expose each LED simultaneously and uniquely. A non-linear clock is applied to the LED drivers as the reference clock to create the unique LED on time circuit. An Exposure RAM stores the data as parallel 8-bit data. A LATCH code received at an ASIC converts the Exposure RAM data into a serial bit stream. The preferred embodiment employs a 60 MHz clock, however, it should be readily apparent that numerous other clocking speeds can be employed. From this a linear or non-linear clock stream is created allowing 256 unique (linear or non-linear) exposure on times to the printhead driver circuitry. This is accomplished with a non-linear clock stream which allows a unique period for each clock period which then allows each increment of exposure time to be unique.

20 Claims, 10 Drawing Sheets

MULTIPLE-LEVEL PRINTHEAD USING EMBEDDED HIGH SPEED SERIAL DATA AND CONTROL LINK WITH ON-BOARD EXPOSURE CLOCK GENERATION

FIELD OF THE INVENTION

The present invention relates to LED based print heads, and more specifically, to a printhead that provides an exposure clock on the print head itself.

BACKGROUND OF THE INVENTION

There are numerous prior art disclosures teaching printhead designs. Typical among these prior art teachings, are designs that employ a writer interface board (WIF) to output image data and control signals such as: clock signal; token signals; latch signals; and power to the printhead board. An example of such a prior art disclosure is U.S. Pat. No.: 5,818,501 entitled *Apparatus And Method For Grey Level Printing With Improved Correction of Exposure* that issued to Ng et al. on Oct. 6, 1998. A problem that exists with this type of design is the number of cables that are employed in the interface between the WIF board and the printhead board, as well as the high speed clocking that is required by present day designs.

There are also numerous prior art disclosures employing center pulse width modulation (PWM) exposure techniques in order to obtain multi-level printing capability. An example of a center PWM is U.S. Pat. No. 4,750,010 entitled *Circuit for Generating Center Pulse Width Modulation Waveforms and Non-Impact Printer Using Same* that issued to Ayers et al. on Jun. 7, 1988. This prior art teaching is useful in providing a traditional center PWM technique, however, the methods taught within this prior art disclosure still creates transient currents (noise) when used for high speed and high quality (large bit depth) printing. Moreover, jagged graphics result using such methods.

For high speed and high quality (large bit depth) printing, a quasi-centered-PWM method has been employed by the prior art to maintain lower transient currents and thus, lower noise, and achieve centered lines/graphics resulting in less jaggedness than provided by the traditional center-PWM techniques. Additionally, quasi-centered PWM has provided superior performance associated with high speed and image quality for larger bit depth and better uniformity correction. However, this higher speed causes an increase in electro-magnetic interference (EMI) which is a problem within the prior art that is addressed by the present invention.

Electrophotographic tone-reproduction processes have an inherent non-linear nature. In an LED tone-reproduction system, non-linear exposure clocks are desirable to assist in accommodating this non-linear nature. A non-linear clock is one in which the periodicity changes and is typically programmable to provide gradations of exposure more realistically related to human perception. Non-linear clocks are also used to balance LED exposure to correct for non-uniformity in illumination from printhead to printhead. Prior art designs employing non-linear clocks have a shortcoming in that they require a very high-speed exposure clock is still required resulting in EMI.

In U.S. Pat. Nos. 5,126,759 and 5,253,934 light-emitting diode (LED) printheads are described having a plurality of input lines for inputting control signals and image data to each of a plurality of driver ICs located on the printhead. In addition to power ($V_{CC}$ and $V_{DD}$) and ground, other control signal lines include an exposure-clock signal (EXPCLK), latch signals, a token bit signal, a token bit clock signal for shifting the token bit and a token bit directional signal for determining the direction for latching data in the driver chip. As noted in the aforementioned patents, the exposure-clock signal provides non-linear clock pulses used by the driver for controlling the pulse width modulated on time of each LED in accordance with a plurality of image data bits associated with a particular pixel to be recorded. The token bit signal is used to designate a latch register which is associated with a particular LED for latching of a multi-bit data signal. As data is forwarded to a data bus in the driver, the token bit, token clock signal and token bit directional signal allow appropriate image data to be captured in a corresponding latch register. The respective data can then be printed for respective periods determined by the image data and the exposure clock pulses. In addition to the noted control signals, additional select signals are provided to the driver chips to decode various modes of operation. Among these modes are two modes that allow a multiplexed data signal to access two registers (LREF and GREF) common to every driver chip. These registers are used to bias the current output level of the drivers. In addition, there is a mode which allows a "bias monitor" output to be activated which controls monitoring of driver current in an extra channel. All of these additional functions are accessed serially in time over the same line. Since normal operation of passing image data over this same line is one of the defined modes of operation, this excludes access to these other functional modes during normal operation, i.e., when image data is passed over the line.

Traditional circuits employing differential receivers and transmitters are proving to be increasingly ineffective system design approaches as bit depth increases with corresponding increases in printing speed. Prior art designs that have their control signals, such as data-clock, token, latch, and exposure-clock, generated on a separate interface board are outdated because of the large number of conductors carrying high-speed signals resulting in bulky connectors and cables that are inherently less reliable and more costly. Moreover, these prior art designs generate undesirable effects such as EMI, signal distortions and timing skews. These problems can limit the performance of the exposure system. Accordingly, prior art designs do not result in a printhead design that is desirable in terms of modern performance requirements.

There are still many designs that employ differential receivers and transmitters for one reason or another. A specific reason that is applicable to the present invention deals with the increasing functionality of integrated circuits (ICs) and circuit boards supporting such ICs has made testing of the boards by conventional techniques ever more difficult. For this reason, the Institute of Electronic and Electrical Engineers (IEEE) has adopted a standard (1149.1) for testing circuit boards by a technique known as boundary scan. The IEEE 1149.1 proposal is substantially identical to the boundary scan architecture adopted by the Joint Test Action Group (JTAG) of Europe and North America which is described in the document JTAG Boundary Scan Architecture Version 2.0, published in March 1988. In accordance with the JTAG and IEEE boundary scan architecture individual boundary scan cells in a device (i.e. an integrated circuit) are serially linked to establish a boundary scan register. Under the control of a test access port (TAP) controller in each device, each bit of an externally generated test vector is shifted into successive cells. Thereafter, the bit in each "output" cell (i.e., a cell whose parallel output is fed to another cell) is applied to each "input" cell (i.e., a cell whose parallel input is coupled to an output cell). The bit at the parallel input of each "input" cell is captured (i.e., retained in place of the bit originally shifted into the cell). After the bits are captured, the bits are serially shifted out of the cells and are compared to the bits in a vector expected to be produced when no faults are present. Any deviation indicates a faulty connection between cells. Prior art printhead designs have employed the JTAG and IEEE boundary scan architecture to transfer specific types of data as well as uses related to boundary scan architecture.

In summary, prior art designs that generate high-speed control signals, data, and specifically exposure-clocks, on a separate interface board are outdated because of the large number of conductors carrying high-speed signals. This results in bulky connectors and cables that are inherently less reliable and more costly. Moreover, these prior art designs generate undesirable effects such as EMI, signal distortions and timing skews. These problems can limit the performance of the exposure system. In view of the foregoing discussion it should be apparent that there remains a need within the art for a print head design that generates the exposure clock and additional control signal on the printhead itself.

SUMMARY OF THE INVENTION

The present invention addresses the above-discussed problems in the prior art, specifically, problems related to Electromagnetic Interference (EMI) resulting from exposure-clock speed and data line transmission. A method and apparatus for an LED printhead used in electrophotographic printing that generates an exposure clock for a plurality of LED and a plurality of LED's on the printhead. The present invention provides a high-speed interface that transmits print data that has been modified, or corrected, using the corresponding unique printhead brightness data as the base reference source data to the printhead boards. The corrected print data is then applied to the LED drivers that expose each LED simultaneously and uniquely. A non-linear clock is applied to the LED drivers as the reference clock to create the unique LED on time circuit. An Exposure RAM stores the data as parallel 8-bit data. A "LATCH" code at a digital circuit converts the Exposure RAM data into a serial bit stream, there are numerous clocking speeds that can be employed. From this a linear or non-linear clock stream is created allowing unique (linear or non-linear) exposure on times to the printhead driver circuitry. This is accomplished with a non-linear clock stream which allows a unique period for each clock period which then allows each increment of exposure time to be unique.

Another object of the invention is to reduce data cable size and increase data cable flexibility. These and other objects are addressed by employing a design approach that generates the exposure clock on the printhead itself allowing for a much higher speed exposure clock than known within the prior art. Additionally, a high-speed serial link interface having fewer wires, as well as smaller and more flexible cables and connectors, results in substantially lower EMI problems than in prior art devices.

The present invention provides a system whereby placing the exposure-clock on the printhead allows for a system that can have the printing control signals embedded within the high speed data channel, thereby reducing the number of external wires necessary for printhead control. The present invention also provides for a system that allows for high-speed synchronization between the data and control signals.

BRIEF DESCRIPTION OF THE DRAWINGS

The invention and its objects and advantages will become apparent upon reading the following detailed description and upon reference to the drawings, in which.

DETAILED DESCRIPTION OF THE PROFFERED EMBODIMENTS

Figure 1A:
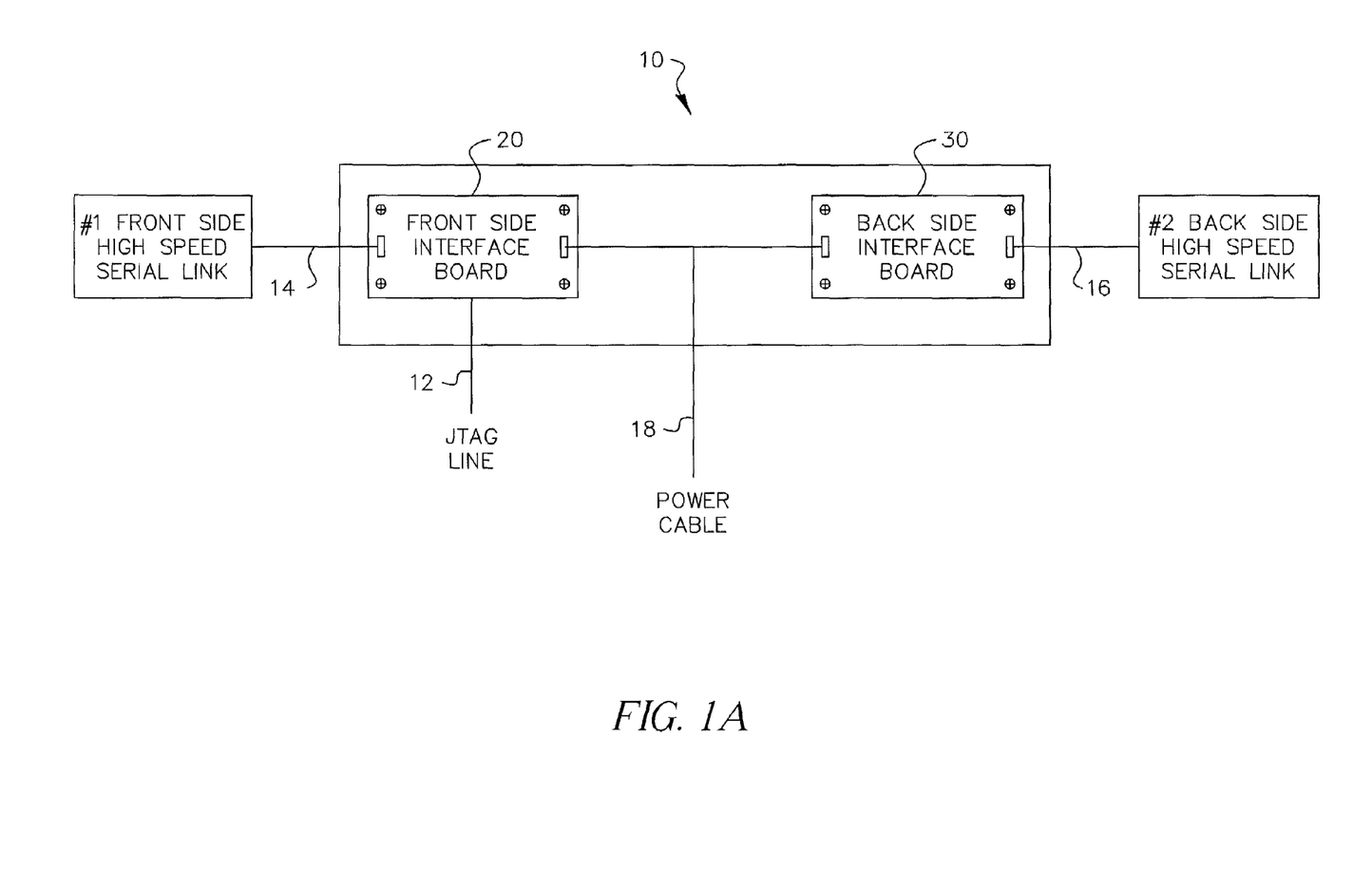
FIG. 1a is a block diagram illustrating the interfaces of a multi-level LED printhead board as envisioned by the present invention.

Referring to FIG. 1a, a block diagram of a system with new multi-level LED printhead 10 as envisioned by the present invention having a front side interface board 20 and a backside interface board 30. Preferably, the front side interface board 20 contains a high speed serial link 14 and the backside interface board 30 contains a high speed serial link 16. The front side interface board 20 retains the JTAG lines 12 taught by prior art designs. The JTAG lines 12 are used for LREF and GREF data loading, system. The preferred embodiment of the present invention employs a printhead having 8064 pixels with a corresponding 8064 drivers for those pixels. The front side 20 and the back side 30 interface boards are arranged such that each will provide the interface for half the pixels. The front side interface board 20 provides the data and control for the first 4032 pixels, while the backside board 30 provides the data and control signals for pixels 4033 through 8064. The interface boards 20, 30 are arranged to interface with the lower and upper half of the pixels respectively, with each of the interface boards 20, 30 providing signals for both odd and even pixel within that range.

Figure 1B:
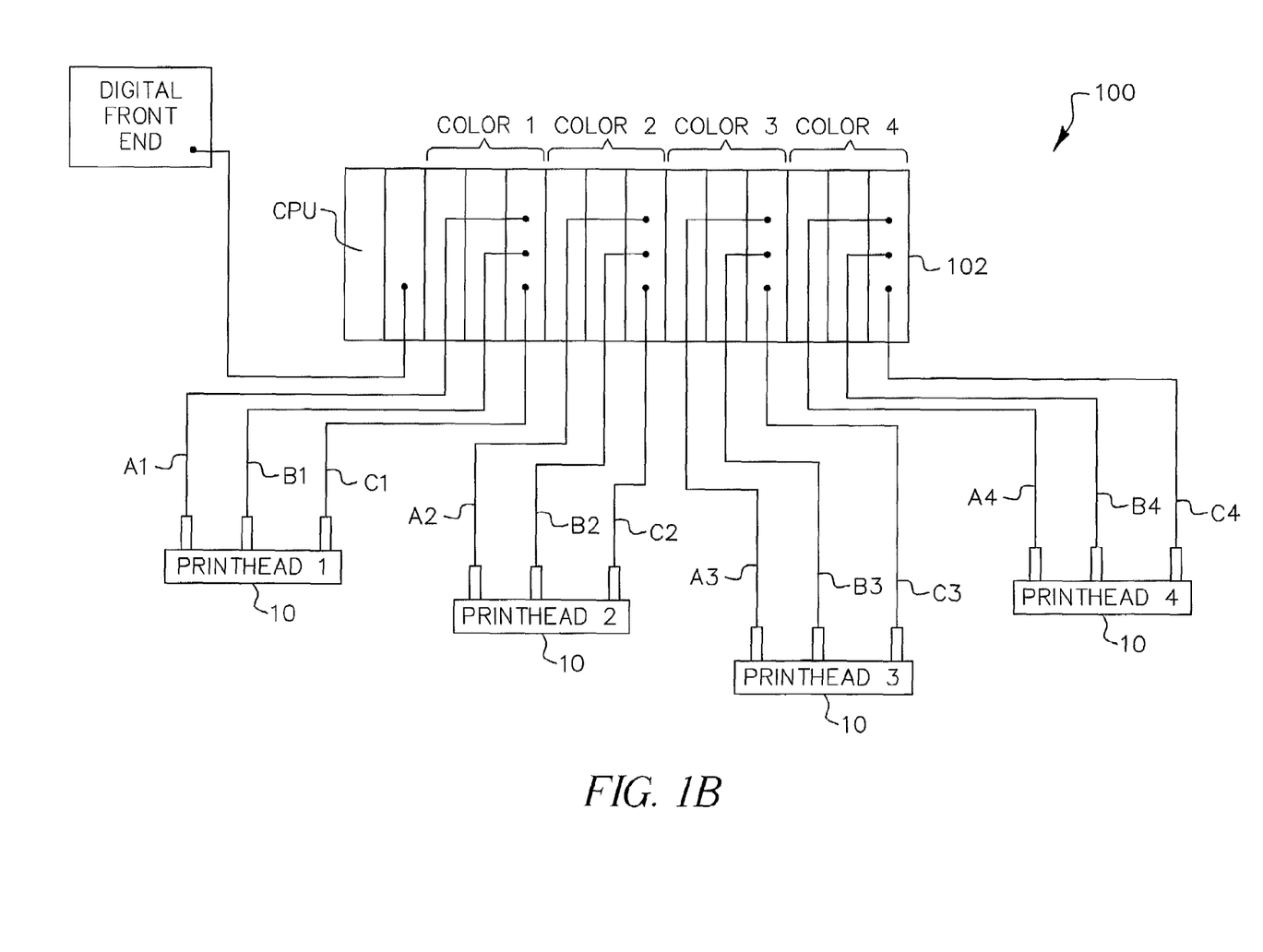
FIG. 1b is a system block diagram for multiple LED printheads as envisioned by the present invention.

FIG. 1b illustrates the type of system 100 that is envisioned by the present invention, having multiple printhead boards, each interfacing with electronics within a VME card cage 102, to produce multiple colors images. In FIG. 2, a four color system is shown, however, any number of colors is conceivable. Each of the printheads in FIG. 1b will have: a front side interface high speed serial link A1, A2, A3, A4; back side interface high speed serial link B1, B2, B3, B4; and a JTAG interface C1, C2, C3, C4. Each of the printhead boards 10 will receive signals from a WIF board in the VME card cage 102 as dictated by the system controller, which is a CPU.

Figure 2A:
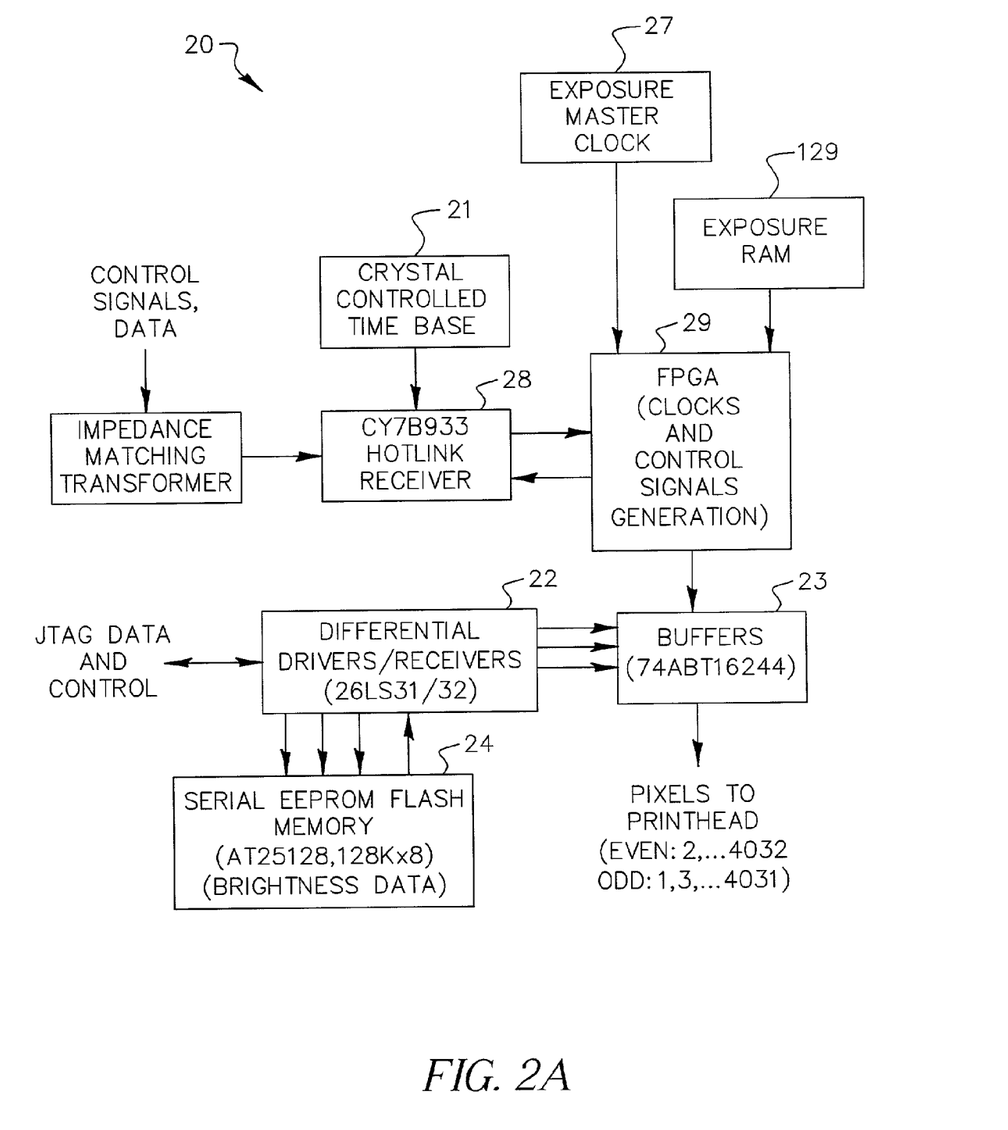
FIG. 2a is a block diagram of the front interface board illustrating JTAG interface lines and high speed data communications.
Figure 2B:
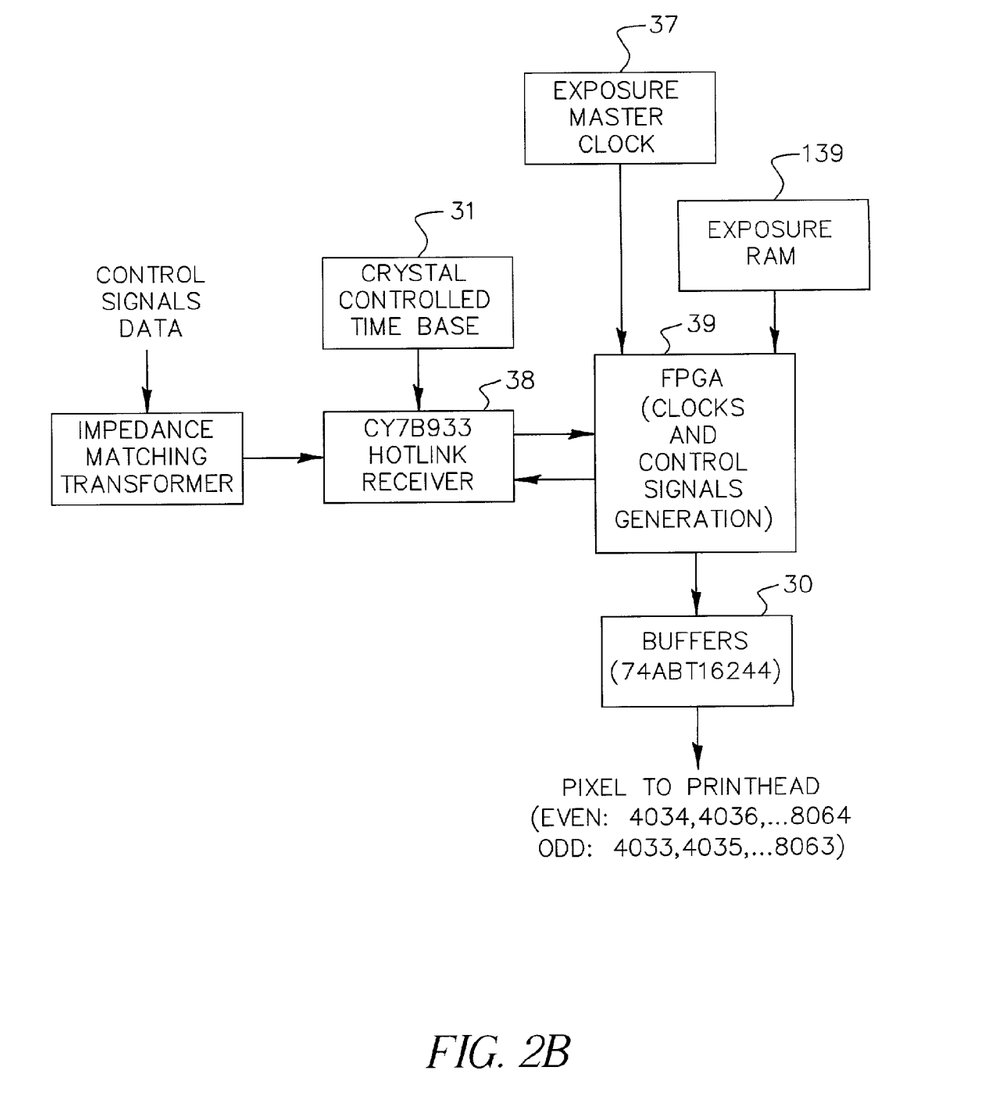
FIG. 2b is a block diagram of the back interface board illustrating high speed data communications interface.

FIGS. 2a and 2b illustrate functional block diagrams respectively, for the front side and backside interface boards 20, 30. A high speed serial interface is provided between the interface boards 20, 30 by interfacing a Write Interface Board (WIF) to the printhead 10. The WIF provides a high-speed state machine controller (typically based on an ASIC or FPGA) that will combine printhead data and printhead instructions. The combined data and instructions is send via a pair of Hotlink® transmitters (CY7B923) at a rate of 40 Mbytes/sec to a pair Hotlink® receivers (CY7B933), one receiver for each the front side interface board 20 and the back side interface board 30. Printhead data includes image data for printing and data for the on-board exposure clock coefficient RAM (ECC RAM). Printhead instructions are special characters and used to instruct the front side or back-side interface boards to generate appropriate control signals during printhead setup and printing. Examples of printhead instructions include: load exposure clock coefficient RAM for color n (n can be 1, 2, 3, 4 (the number of colors is limited by the size of the on-board ECC RAM); generate token signal; generate latch signal; generate exposure clock for color n. Additional printhead instructions can be defined as needed.

The LED printhead as envisioned by the present invention employs a printhead having front side and backside interface boards 20, 30. The front side interface board 20 in the preferred embodiment employs JTAG interface lines 12 to provide communication relative to printhead brightness data store in the non-volatile memory device 24 (flash memory or $E^2PROM$) on the printhead board 10. The light output of a specific LED is controlled by changing the current through the LED. A reference voltage (or current) within specific amplifiers inside the drive electronics control the LED current. These reference values are set by digital data values contained in registers within each driver. There are two reference values, a local reference (LREF) and a global reference (GREF). The local reference may be a different value for each driver and is used to compensate for differences from driver to driver so that an overall consistent light output may be obtained. For instance, the even driver for an array may require a lower local reference value than the odd driver in order to obtain the same light output from all LED's in the array. On the other hand, the global reference is the same for all drivers. It provides a mechanism for controlling the overall light output for the entire array. The LREF and GREF registers are accessed through the JTAG port contained on each individual driver. The amount of time that a particular LED is activated is controlled by an exposure-clock. The exposure-clock counts clocks during the exposure time. The time that the LED is on during the exposure time is determined by the particular LED's image data. If the image data is 00H, the LED does not turn on during any portion of the available exposure time. If the data is FFH, the LED is on for the full duration of the clock. The value for the image data is determined by imaging electronics outside the printhead electronics.

FIG. 2a shows a schematic block diagram of the front interface board 20. The slower speed JTAG lines 12 (TDO, TDI, TCLK, TMS, Flash_cs, Flash_so) are connected to standard differential line transceivers 22 and are used for slower speed communications tasks such as Gref loading, Lref loading, printhead diagnostics. JTAG lines 12 also provide data communication to a non-volatile memory device 24 (which in the preferred embodiment is a serial EEPROM) where the printhead brightness data is stored. Buffers 23 are used to drive signals with heavy loads, such as the TDO, TDI, TCLK and TMS lines. In the preferred embodiment, a serial EEPROM is used for non-volatile memory device 24 (instead of a parallel EEPROM) so that the low usage printhead brightness data can be addressed via the JTAG lines 12 alone without having to use the high speed data channel. This will simplify the data retrieval because one does not have to use a serial to parallel converter and associated control circuits.

In FIG. 2b, each of the front side and backside interface boards 20, 30 have a high-speed serial interface. In the preferred embodiment the high-speed serial interfaces are implemented using Hotlink™, however numerous other high-speed interfaces could also be used. Separate crystal controlled oscillating time bases 21, 31 provide reference clocks to the high-speed serial interface on each of the front side and back side interface boards 20, 30. The high speed serial interface in the preferred embodiment works as follows: parallel commands and data are converted to a high speed serial stream at the transmit end of the link (outside the printhead), the receivers 28, 38 on the front and back side interface boards 20, 30 on the printhead 10 receives this serial information and converts it back into parallel commands and data that are received by that interface boards' ASIC 29, 39. The ASIC's 29, 39 are operatively connected to the high-speed serial interface as well as to an exposure master clock 27, 37 and an exposure memory device 129, 139 respectively for each of the front side and back side interface boards 20, 30. The ASIC's 29, 39 are responsible for generating an exposure-clock using the timing from the exposure-master clock 21, 31 and exposure memory device.

The exposure memory device 129, 139 stores exposure data that is generated from brightness data previously stored in the non-volatile memory 24. A system controller generates the exposure data. The system controller is envisioned as a CPU located within the VME card cage that is part of the image path and not on the printhead itself. Storing data in non-volatile memory 24 on the printhead alleviates problems associated with having an external storage device (floppy, etc) that must be mapped to a particular printhead. The brightness data is gathered during calibration of the printhead 10 and varies from LED to LED and from printhead to printhead. The data that is stored in the exposure memory device 129, 139 is the result of uniformity calculations made using the brightness data and photo-conductor data. The loading/unloading for the brightness data can occur in one of two ways. In one embodiment the data is input through the high-speed serial link and switched to the other (JTAG) interface area. In the second, the data is input through the JTAG interface. In the preferred embodiment, the non-volatile memory 24 containing brightness data is a serial Flash device accessed via the serial JTAG lines 12, the exposure data stored in exposure memory 129, 139 (which in the preferred embodiment is a SRAM) is loaded via the Hotlink™ and read while printing via the ASIC and while testing via the JTAG lines. During calibration of the printhead 10 an initial set of exposure data is generated. This is the default exposure data (stored on the system hard drive) that is loaded into the exposure memory device 129, 139 when the printhead 10 is powered up. By having the brightness data available to the system CPU, new exposure data can be generated at a later date based on changing system variables.

In addition to the exposure data in the exposure memory device 129, 139, the brightness data has other compensation files generated and applied to the input image data that eventually gets sent to the LED. This is done off-board of the printhead 10. In effect the system functions by compensating the input data and the amount of time that the LED is on, to allow for variations in LED brightness across the printhead 10, and to allow for specific non-linear properties of the photo-conductor. A plurality of LED's on the printhead 10 are driven by a plurality of LED drivers also on the printhead 10. The drivers are controlled by the exposure-clock generated by the ASIC's 29,39. The ASIC's generate the exposure-clocks based on the exposure master clocks 27, 37 and the exposure data it retrieves from the exposure memory device 129, 139. The ASIC's 29, 39 in the preferred embodiment are of a Field Programmable Gate Array (FPGA) type such as CMOS based Xilinx® or Altera® FPGA devices. However, other semiconductor devices classified as FPGA devices based on fusible link technology could also be used. Additionally, standard cell and gate arrays could also be used for this purpose.

The preferred embodiment of the invention preferably employs a serial $E^2$PROM or serial FLASH memory device as serial non-volatile memory device 24 for the storage of the brightness data. The brightness data is loaded into the serial non-volatile memory device 24 via JTAG lines 12 and downloaded from the serial non-volatile memory device 24 via JTAG lines 12. However, it will be understood by those skilled in the art that other non-volatile memory devices could also be employed, an example would be a RAM device having a permanent power source such as a battery. The present invention specifically envisions alternate embodiments wherein the brightness data to be stored in the serial non-volatile memory device 24 can be configured to come through either the low speed serial JTAG lines 12 in serial manner or over the high speed serial link. As in the preferred embodiment, the low speed JTAG interface is more readily used with a storage device whose design is based on serial loading and unloading whereas the high speed serial interface would be more readily adapted to a parallel storage device such as a non-volatile RAM device. In any event a serial-to-parallel converter could be used with the JTAG interface if a parallel storage device is used whereas a parallel-to-serial converter could be used with the high-speed serial interface if a serial device is used. Additionally, the mode of loading data into the non-volatile memory could be switched from one mode to the other through commands sent across either interface to the ASIC. The switch would operate to switch in and out the parallel-to-serial or serial-to-parallel converter.

In addition to loading the brightness data into the non-volatile memory 24 via either the high-speed serial interface or the JTAG lines 12, the present invention also envisions a similar process for loading exposure data into the exposure memory 129. In the preferred embodiment the exposure memory 129 is a volatile parallel storage device, such as an SRAM. The exposure data is loaded into the exposure memory 129 over the high-speed serial interface each time power is applied to the printhead. The exposure data is read in a parallel fashion from the device by the ASIC 29 during printing and is used, along with the exposure master clock 27 to generate the exposure-clock. When in test mode, the data is read from the exposure memory 129 using the low speed interface via serial JTAG lines 12. A parallel-to-serial converter implemented inside the ASIC 29 converts the parallel data into serial data that is shifted out the low speed JTAG interface to test equipment external to the printhead 10. The current invention also envisions loading the exposure data into the exposure memory 129 over the low speed interface via JTAG lines 12. The exposure data would be received in a serial fashion by the ASIC 29, converted to parallel format, and stored in the exposure memory where it is then read in parallel fashion by the ASIC 29 during printing (as is currently done). It is also envisioned that a non-volatile memory device such as FLASH EEPROM or non-volatile RAM could be used for the exposure memory 129. By using a non-volatile device, the data would not need to be reloaded at each power cycle.

Figure 3A:
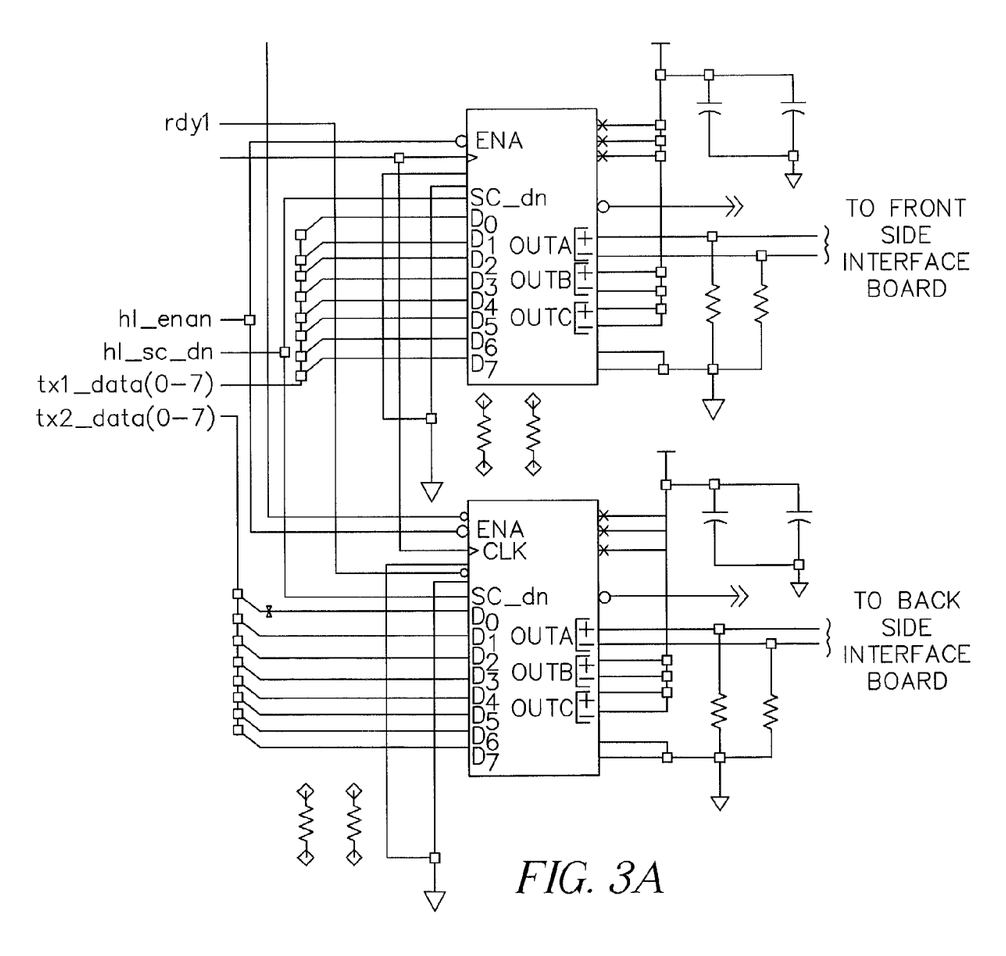
FIG. 3a is a diagram of a high speed transmitter used to transmit data to the printhead board in the present invention.
Figure 3B:
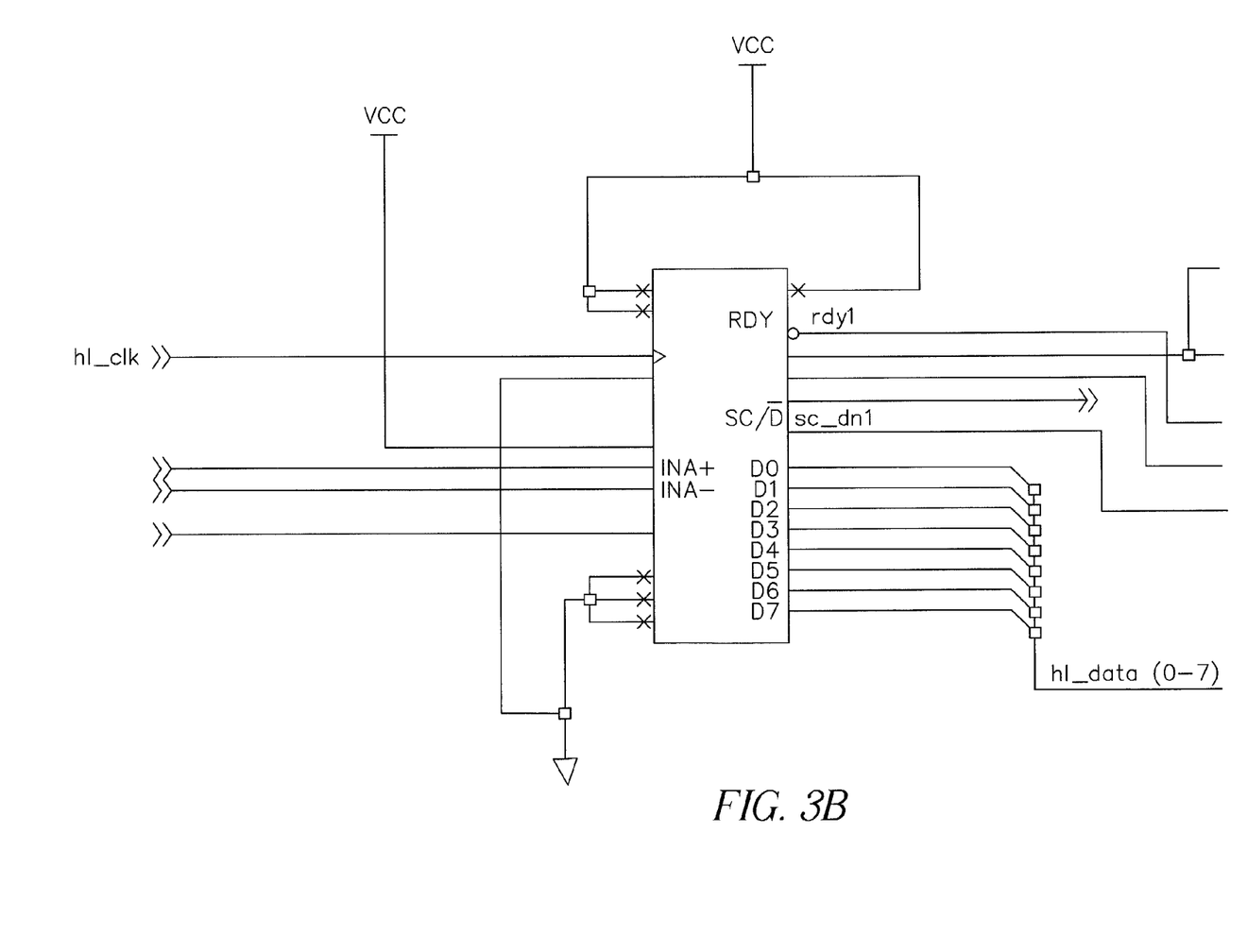
FIG. 3b is a diagram of a high speed receiver used to receive data from the transmitter board in the present invention.

Referring to FIGS. 3a and 3b in conjunction with the previously discussed FIGS., the front side and back side interface boards each have separate receivers that need to be synchronized with one another. The synchronization of the transmitter on the transmit side of the high-speed link with the receivers on the printhead front-side and backside interface boards is accomplished via implementation of crystal controlled time base. The transmitter uses the crystal controlled time base reference along with its phase-locked loops (PLL) to generate a bit-rate clock used to encode the parallel data on the input side of the device into a high-speed serial stream. The transmitters on the transmit side of the link employ phase-locked loops that are internal to the devices.

On the transmit side of the link (outside the printhead), a high-speed state machine controller, based on an ASIC or FPGA, combines printhead data and printhead instructions and sends them to a pair of Hotlink™ transmitters (CY7B923) one for the front side interface board and the second one for the back side interface board of the printhead at 40 Mbytes/sec rate each. Data flowing across the link consists of commands to the printhead, image data for printing, and exposure data to be stored in the exposure memory 129. Printhead instructions are special characters used to instruct the front-side or backside interface boards to generate appropriate control signals during printhead setup and printing. Examples of printhead instructions include: load exposure memory 129 for a particular color n, generate token signal, generate latch signal, and generate exposure-clock for color n. In the preferred embodiment n can be 1, 2, 3, or 4. The number of colors is limited by the size of the exposure memory. Additional printhead instructions can be defined as needed.

On the transmit side of the Hotlink™ interface eight data inputs are converted to either a Data symbol or a Special Character depending on the state of the SC/~D input. If SC/~D is logic HIGH, the data inputs represent a control code and are encoded using the Special Character code table. If SC/~D is logic LOW, the data inputs are converted using the Data code table. The receivers 28, 38 on the front-side and backside interface boards also employ phase-locked-loops internal to the devices. The embedded PLL "tracks the incoming bit stream and aligns the phase of its internal bit rate clock to the serial data transitions." The crystal controlled time base reference of the receivers 28, 38 "provides a byte-rate reference frequency to improve PLL acquisition time and limit unlocked frequency excursions of the recovered clock output when no data is present at the serial inputs." The recovered clock output of the receivers 28, 38 drives the ASIC's 29, 39 and is used to synchronize the state machines with the ASIC's 29, 39 with system data flow.

Another control signal that is output from the receivers 28, 38 is the SC/~D signal. This signal is used by the ASIC's 29, 39 to determine if the received data is a control code or data. The receivers 28, 38 can identify control bytes within the recovered byte because the transmitter encodes control information using the Special Character table. If the receivers 28, 38 determine that a byte is a control code, it forces it's SC/~D line to logic high. The ASIC's 29, 39 will then use the byte as a system control instruction rather than a data byte. As an example of a transfer sequence, consider the transfer of exposure data across the high-speed channel to the front-side and backside interface boards 20, 30. Both boards operate in parallel so a description of the transfer across one is identically a description of the other. In the first part of the transfer the transmitter input is presented with the control code for 'Load Exposure Ram' along with the SC/~D bit at logic high. The transmitter encodes this byte as a Special Character. The exposure data to be transferred is then consecutively applied to the input of the transmitter with the SC/~D pin at logic LOW. The transmitter encodes the data using the Data code table. When all data has been sent the control code for 'End Exposure Ram Loading' is applied to the input of the transmitter with the SC/~D pin forced to logic HIGH. The transmitter encodes this byte as a Special Character.

When the first byte is received by the receiver 28, 38, it determines it is a Special Character and forces the SC/~D line to logic HIGH. The ASIC 29, 39 recognizes this as a control code and starts the state machine that handles loading exposure data into the exposure memory 129, 139. The receiver 28, 38 then decodes the next byte as data and forces it's SC/~D line to logic LOW. The ASIC 29, 39 recognizes the state of the SC/~D as signifying a data byte was received and stores it in the exposure memory 129, 139. This continues until the end of the transfer when the receiver encounters the ending Special Character and forces the SC/~D line high. The ASIC 29, 39 recognizes that a control character is present from the state of the SC/~D line and decodes the character as 'End Exposure Ram Loading' which stops the exposure memory state machine. The exposure memory state machine is part of the firmware that a is control function of ASIC 29, 39. All control codes and data transfer sequences occur in a similar manner. For instance when printing, the transmitter will encode the 'Start Print' command, followed by the 'Generate Token' command, followed by the image data, followed by a 'Generate Latch' command. The ASIC will recognize the 'Start Print' command and will start the print cycle. When the 'Generate Token' command is decoded, the ASIC 29, 39 sends the token signal to the LED drivers and synchronizes the shift clock used to transfer data to the drivers. As the data bytes are received the ASIC 29, 39 sends the recovered data to the drivers. When the 'Generate Latch' command is decoded the ASIC 29, 39 generates the latch signal that transfers data from the slave registers in the drivers to the LED registers and starts the state machine that generates the printhead exposure-clock based on the data in the exposure memory 129, 139.

In addition to control codes received across the high-speed interface, other control codes are sent across the low speed interface. In general these codes are used in testing and debug or when data can be sent to the interface boards at a low rate. In some circumstances test data is sent across the high-speed link and read back across the low speed link.

Figure 4:
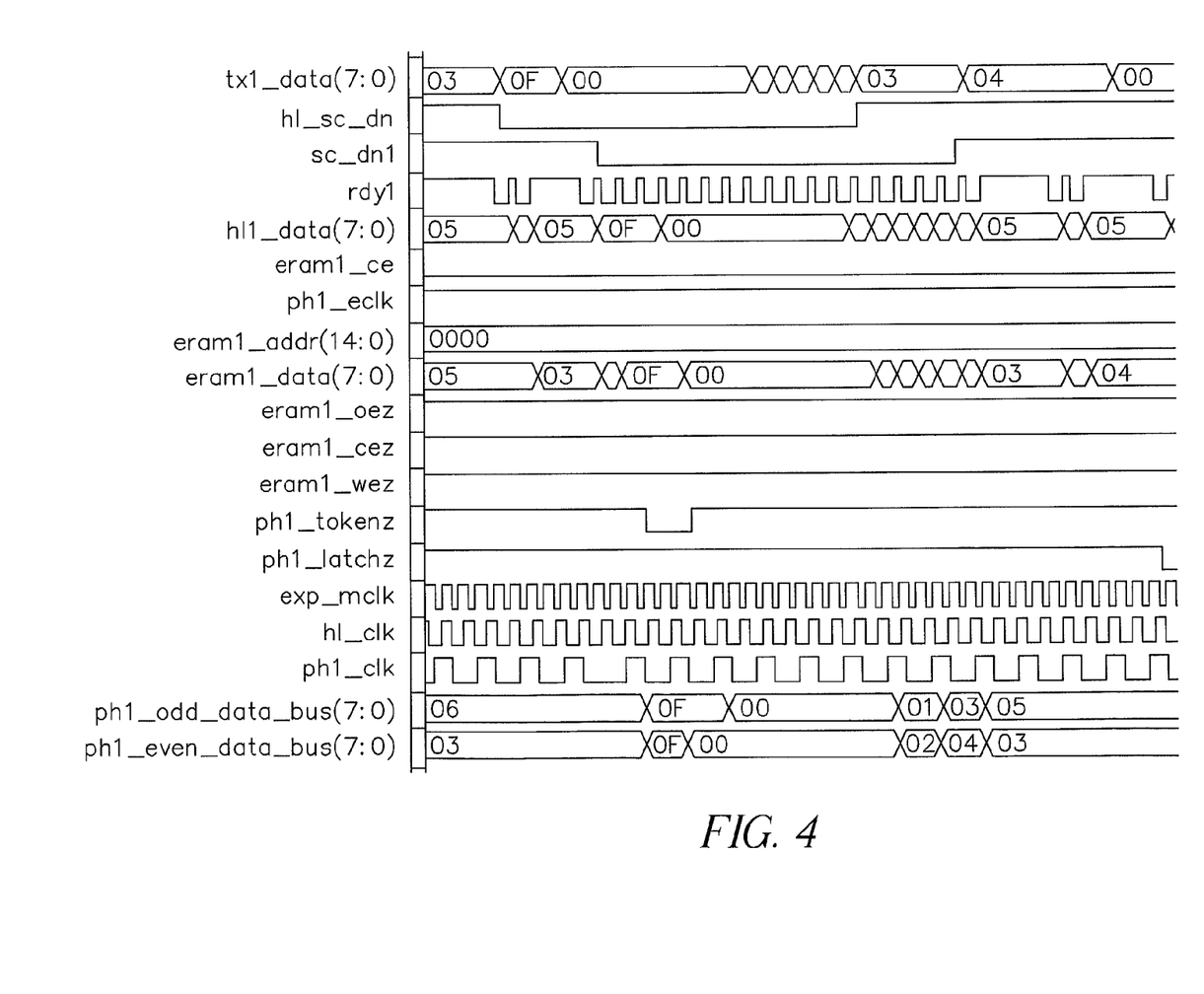
FIG. 4 is a timing diagram illustrating the transmission of a short line of data to the printhead board of the present invention.

Referring to FIG. 4 in conjunction with the FIGS. 1–3, a timing diagram is illustrating the basic timing of data and control signals for a short line of data that is loaded into the printhead. The loading cycle begins with tx1_data which is the input data to the transmitter and h1_sc_dn which is the SC/~D input to the transmitter from the transmit control ASIC. In the beginning of the cycle h1_sc_dn is high indicating the special character contained on the tx1_data lines is being loaded into the printhead. In this case the special character is 03, which results in the token signal ph1_tokenz being generated by the receiver ASIC 29, 39. The sc_dn1 timing trace illustrates the signal that is the recovered SC/~D signal that is derived from the h1_sc_dn at the receiver and goes to the receiver ASIC 29, 39. Rdy1 is a timing signal from the receiver to the receive ASIC. The h11_data trace represents the data recovered at the receiver end of the high speed interface from the tx1_data lines. All eram1 signals are the signals to the exposure memory ram device. Note that it is not accessed during printhead loading. The ph1_latchz is the latch signal generated by the receiver ASIC 29, 39 based on the '04' control code received, the ph1_odd_data bus is the odd side data bus out to the drivers at rising ph1_clk edges, and the ph1_even_data_bus is the even side data bus out to the drivers at rising ph1_clk edges.

Figure 5:
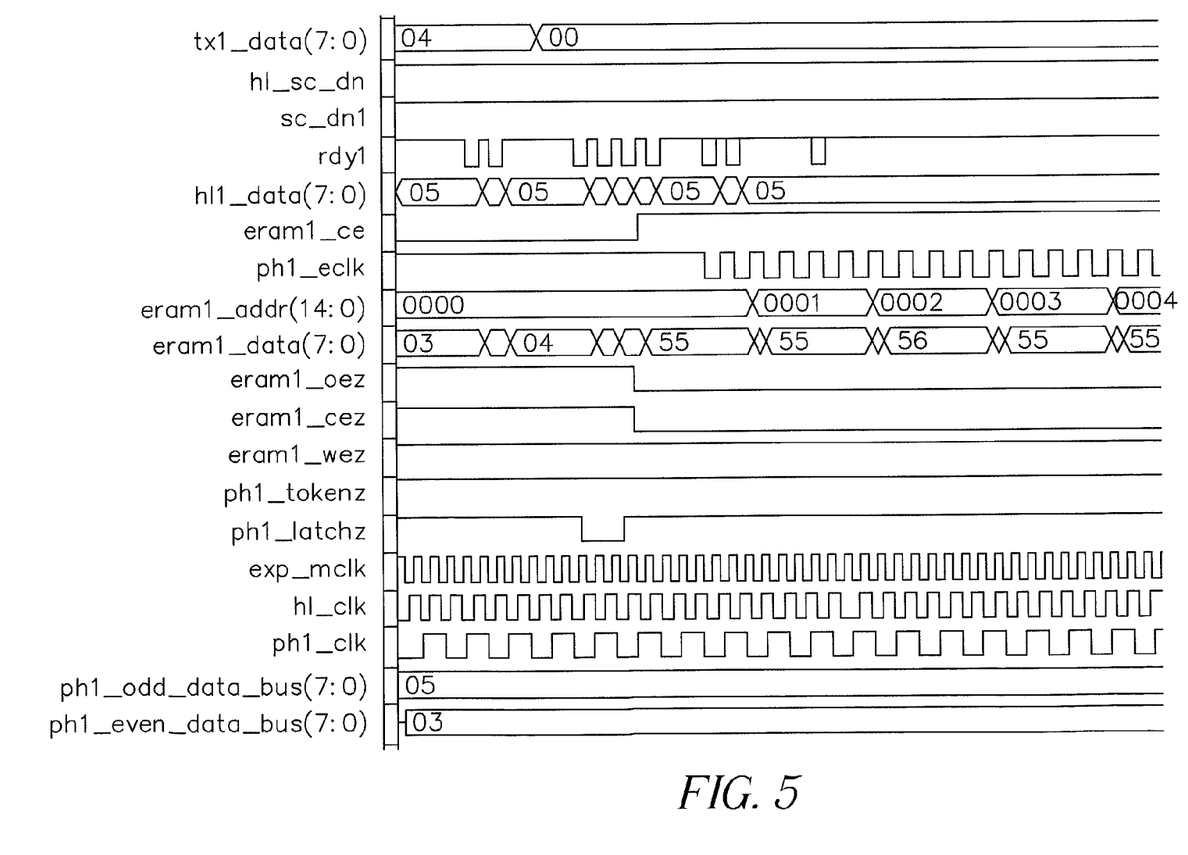
FIG. 5 is an expanded version of a portion of the timing diagram shown in FIG. 4.

FIG. 5 is an expanded view of the end portion of the timing diagram illustrated in FIG. 4. As can be seen in FIG. 3a, this is the point where the latch signal ph1_latchz is generated. Notice that shortly after the rising edge of the latch signal ph1_latchz, the exposure RAM chip enable and output enable signals become active (eram1_oez, eram1_cez) allowing the exposure RAM to be accessed. At this time a '55' appears on the data bus eram_data. Also notice that shortly after the exposure ram is accessed, the ph1_eclk starts. This is the exposure clock that goes to the drivers on the printhead. For this example the data in the exposure ram is '55' at each address location. If the data varied, the duty cycle of the exposure clock would vary.

Figure 6:
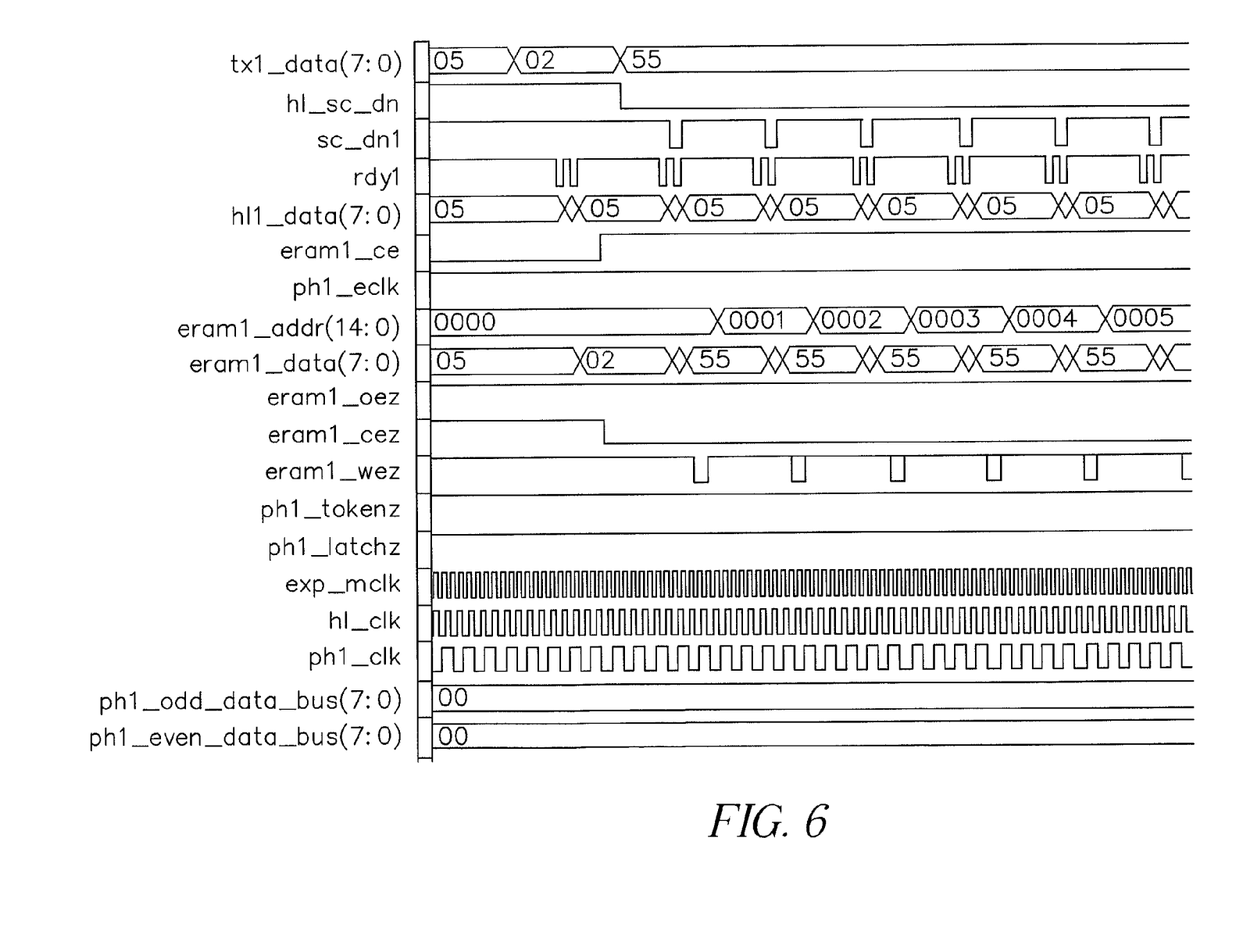
FIG. 6 is a timing diagram illustrating the loading of the Exposure Memory Device.
Figure 7:
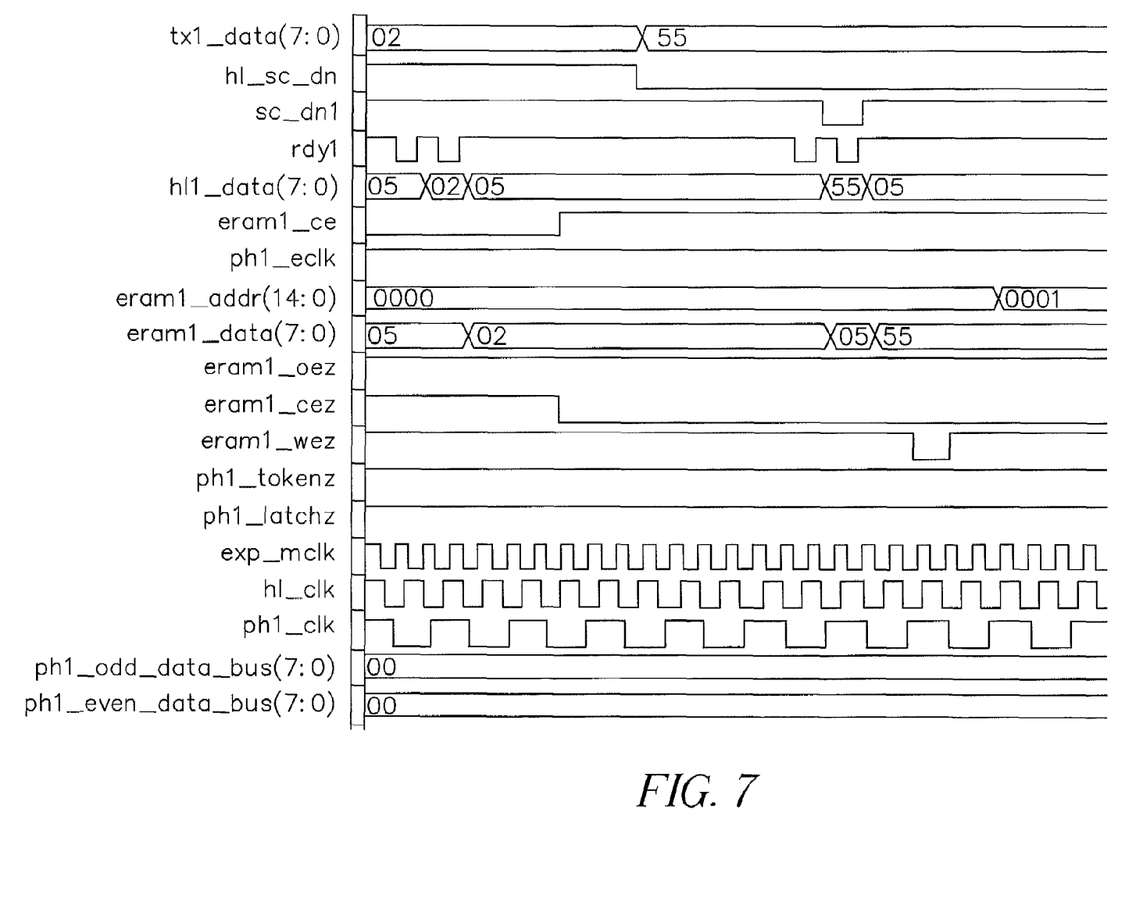
FIG. 7 is an expanded version of a portion of the timing diagram shown in FIG. 6.

FIG. 6 is a timing diagram illustrating the loading of the Exposure Memory Device. The signal tx1_data is seen sending the '02' command with sc_dn1 high along with rdy1 low shows reception of the command character which signifies the start of the exposure ram loading cycle with a corresponding enabling of the exposure RAM device (eram1_ce). Once sc_dn1 toggles low along with rdy1 toggling low, this shows presence of data that is to be load into the exposure RAM device. In FIG. 6, the '05' shown on the various data lines (tx1_data, h11_data, and eram1_data) is a fill character. The '55' data within the small diamond area on the h11_data lines in FIG. 6, that is expanded upon in FIG. 7, is the actual data that is being loaded into the exposure RAM. Notice the Exposure RAM is accessed after reception of the '02' control code.

FIG. 7 is a more detailed version of a portion of FIG. 6. Here, the reception of the '02' control code that initiates access of the exposure RAM, and the reception of the '55' that serves as the data for the exposure RAM that is subsequently loaded into the exposure RAM is more readily apparent. Note that there is no activity on the printhead data busses and that the exposure clock itself (ph1_eclk) is silent.

The present invention provides a high-speed interface that transmits print data that has been modified, or corrected, using the corresponding unique printhead brightness data as the base reference source data to the printhead boards. The corrected print data then feeds the LED drivers directly which exposes each LED simultaneously and uniquely. The non-linear clock also feeds the LED drivers as the reference clock for each unique LED on time circuit. The Exposure RAM stores the data as parallel 8-bit data (received from the Hotlink™ path). At the "LATCH" code the receiver FPGA (VHDL code) converts the Exposure RAM data into a serial bit stream, the preferred embodiment employs a 60 MHz clock, however, it should be readily apparent that numerous other clocking speeds can be employed. From this a linear or non-linear clock stream is created allowing 256 unique (linear or non-linear) exposure on times to the printhead driver circuitry. If a linear clock stream was used, each increment of requested gray level would be an equal increase in linear time. But what is required is a non-linear exposure time curve as gray level value is increased due to the response characteristics of the photoconductor drum. This is accomplished with a non-linear clock stream which allows a unique period for each clock period which then allows each increment of exposure time to be unique. Non-linear clock streams are needed for product envisioned by the present invention, while linear clock streams are sufficient for printhead testing purposes.

The foregoing discussion has detailed the most preferred mode of practicing the invention, other embodiments will be readily apparent to those skilled in the relevant arts, therefore the scope of the invention should be measured by the appended claims.

Parts List

| | |
|---|---|
| 10 | multi-level LED printhead |
| 12 | JTAG interface lines |
| 14 | high speed serial link |
| 16 | high speed serial link |
| 20 | front side interface board |
| 21, 31 | crystal controlled oscillating time bases |
| 23 | buffers |
| 24 | non-volatile memory device |
| 27, 37 | exposure master clock |
| 28, 38 | receivers |
| 29, 39 | ASIC |
| 30 | backside interface board |
| 4100 | system having multiple printhead boards |
| 102 | VME card cage |
| 129, 139 | exposure memory device |

What is claimed is:

1. An LED printhead board having a plurality of LEDs and a plurality of LED drivers for electrophotographic printing comprising:
a high speed serial interface that provides data and control to the LED printhead board;
a first memory device on the LED printhead board that is coupled to the high speed serial interface to store the exposure data in the memory device; and
an exposure clock generated on the printhead board from the exposure data to drive the plurality of LEDs on the printhead.

2. The printhead of claim 1 further comprising a digital circuit that generates the exposure clock for the LEDs, the digital circuit using a master clock and the exposure data as inputs.

3. The printhead of claim 2 further comprising a second memory device that stores a set of brightness data.

4. The printhead of claim 3 further comprising a set of JTAG lines.

5. The printhead of claim 4 wherein the digital circuit is an ASIC device.

6. The printhead of claim 5 wherein the ASIC is coupled to the second memory device.

7. The printhead of claim 1 wherein the high speed serial interface further comprises a plurality of high speed serial interfaces employing receivers employing at least one phase locked loop to synchronize data and commands transferred to the printhead with the transmitting device.

8. The printhead of claim 1 wherein the first memory device stores a plurality of exposure values derived from the brightness data.

9. An LED printhead for electrophotographic printing comprising:
a printhead board having at least one interface that provides communication relative to printhead brightness data;
a non-volatile memory device on the LED printhead board that stores unique printhead brightness data;
at least one high speed serial interface;
an oscillating device that provides a clock to the high speed serial interface;
an ASIC operatively connected to the high speed serial interface;
an exposure master clock and an exposure memory device coupled to the ASIC;
an exposure clock derived by the ASIC;
a plurality of LED's on the printhead; and
a plurality of LED drivers on the printhead, the drivers being driven according to corrected print data, derived from printhead unique brightness data stored in the non-volatile memory, and the exposure clock received from the ASIC.

10. The printhead of claim 9 further comprising wherein the exposure memory stores exposure data derived from the brightness data stored in the non-volatile memory.

11. A method of forming an LED printhead for electrophotographic printing comprising the steps of:
providing the LED printhead board with at least one interface, a plurality of LED drivers, a device for storing exposure data and a master clock; and
creating a digital circuit that inputs the exposure master clock and the exposure data and generates an exposure clock for the plurality of LED drivers on the printhead.

12. The method of claim 11 wherein the step of providing further comprises the at least one interface providing communication relative to printhead brightness data.

13. The method of claim 12 wherein the device further comprises a plurality of devices with at least a first device for storing brightness data and a second device for storing the exposure data.

14. The method of claim 11 wherein the at least one interface further comprises a high speed serial interface.

15. The method of claim 14 wherein the step of creating further comprises that the digital circuit is formed within an ASIC device that is coupled to the exposure master clock and the memory device.

16. The method of claim 15 wherein the step of providing further comprises providing the high speed serial interface with at least one receiver having a phase locked loop based synchronization for data transfer to the printhead.

17. A printhead product for use in electrophotographic printing comprising the steps of:
providing a plurality of LED drivers coupled to a plurality of LED's on the printhead, a first interface that provides communication to the printhead for brightness data and a second interface that provides exposure data;
placing a master clock and a first memory device on the printhead board; and
forming digital circuitry that controls the derivation of a set of LED exposure data values from the exposure data that is stored in the exposure memory employing inputs from the master clock and exposure data from the first memory device to generate an exposure clock for the LED drivers.

18. The product of claim 17 wherein the step of providing further comprises providing as the second interface at least one high speed serial interface with receivers having phase locked loops to synchronize data transferred to the printhead.

19. The product of claim 18 wherein the high speed interface transmits print data to the printhead board that is modified in accordance with printhead brightness data by the ASIC to derive the exposure data stored in the exposure memory.

20. The product of claim 19 wherein the ASIC retrieves exposure data for a specific LED and uses the exposure master clock input in combination with the exposure data to generate the exposure clock for the specific LED that has a duration dictated by the exposure data.

* * * * *